United States Patent
Moscatelli

(10) Patent No.: US 11,117,671 B2
(45) Date of Patent: Sep. 14, 2021

(54) ICE-BREAKING SYSTEM FOR AN AIRCRAFT

(71) Applicant: LEONARDO S.P.A., Rome (IT)

(72) Inventor: Antonio Moscatelli, Turin (IT)

(73) Assignee: LEONARDO S.p.A., Rome (IT)

(*) Notice: Subject to any disclaimer, the term of this patent is extended or adjusted under 35 U.S.C. 154(b) by 269 days.

(21) Appl. No.: 16/169,871

(22) Filed: Oct. 24, 2018

(65) Prior Publication Data
US 2019/0329893 A1    Oct. 31, 2019

(30) Foreign Application Priority Data
Oct. 25, 2017 (IT) .......................... 102017000121327

(51) Int. Cl.
| B64D 15/16 | (2006.01) |
| F16K 11/074 | (2006.01) |

(52) U.S. Cl.
CPC ........ B64D 15/166 (2013.01); F16K 11/0743 (2013.01)

(58) Field of Classification Search
CPC ...... B64D 15/166; F16K 11/0743; F16K 5/12
USPC ........................................................ 251/209
See application file for complete search history.

(56) References Cited

U.S. PATENT DOCUMENTS

| 2,168,328 | A |   | 8/1939 | Diehl |  |
| 2,337,426 | A | * | 12/1943 | Taylor | B64D 15/166 244/134 A |
| 2,515,519 | A | * | 7/1950 | Lawrence | B64D 15/166 244/134 A |
| 2,753,138 | A | * | 7/1956 | MacIntyre | B64D 15/166 244/134 A |
| 2,883,129 | A |   | 4/1959 | Macintyre |  |
| 5,393,014 | A |   | 2/1995 | Weisend |  |
| 6,082,667 | A | * | 7/2000 | Haggard | B64C 9/02 244/123.11 |
| 2016/0296370 | A1 |  | 10/2016 | Farley |  |

FOREIGN PATENT DOCUMENTS

| EP | 2772459 A2 | 9/2014 |
| WO | 2013088319 A1 | 6/2013 |

OTHER PUBLICATIONS

Italian Search Report in IT 201700121327 dated Mar. 29, 2018.

* cited by examiner

*Primary Examiner* — Richard R. Green
*Assistant Examiner* — Madison Elizabeth Dittner
(74) *Attorney, Agent, or Firm* — Henry J. Cittone; Cittone Demers & Arneri, LLP

(57) ABSTRACT

An ice-breaking system for an aircraft, comprising a pneumatic ice-breaking device, an air inlet adapted to receive air from the environment outside the aircraft and an air outlet adapted to discharge air into the outside environment, and a motorized valve having an air loading port connected to the air inlet and an air discharge port connected to the air outlet, the valve being configured to supply air to the pneumatic ice-breaking device in a pulsating way. When the aircraft is in motion, the kinetic energy of the air at the air inlet and originating from the relative motion between the air and the aircraft is converted into air pressure at the pneumatic ice-breaking device, and the air outlet is positioned so that when the aircraft is in motion the air pressure at the air outlet is lower than the outside ambient pressure.

8 Claims, 6 Drawing Sheets

ICE-BREAKING SYSTEM FOR AN AIRCRAFT

CROSS-REFERENCE TO RELATED APPLICATIONS

This application claims priority to Italian Pat. App. No. 102017000121327 filed on Oct. 25, 2017, the disclosures of which are hereby incorporated by reference in their entirety.

FIELD OF THE INVENTION

The present invention refers to ice-breaking systems for aircraft.

BACKGROUND

Known deicing protection systems, such as the "deicing boot", are of a type generally installed on the surfaces of aircraft (usually the leading edges of the wings and the tail fins), which allows for a mechanical-pneumatic defrosting during the flight.

Such system is based on rubber chambers (or membranes) mounted on the surfaces to be defrosted. When ice forms, a pneumatic system is activated to cyclically inflate and deflate the membranes. Repeated cycles of expansion and contraction cause cracks in the accumulated ice, which is swept away by the airflow over the surface of the aircraft.

Known systems use compressed air drawn from the aircraft's propulsion system or from dedicated accumulators; such systems are generally relatively bulky and heavy and have a negative impact on the consumption and performance of the propulsion system. Moreover, being relatively complex, they can require a significant level of maintenance.

WO 2013/088319 A1, EP 2772459 A2 and US 2016/296370 A1 describe pneumatic systems based on rotary valve members, which use pneumatic energy generated or stored within the system for their operation. U.S. Pat. No. 2,337,426 A describes an ice-breaking system that uses a rotary valve member to power ice-breaking devices, which consumes pressurized air generated in the engine nacelles. The use of pressurized air generated or accumulated inside the aircraft also appears in U.S. Pat. No. 5,393,014 A and U.S. Pat. No. 2,883,129 A.

SUMMARY OF THE INVENTION

One of the objects of the present invention is to make available a system to supply air to a pneumatic ice-breaking device that allows for one or more of the aforementioned problems to be at least partially overcome.

For such purpose, an ice-breaking system for an aircraft is the object of the invention, comprising
  a pneumatic ice-breaking device;
  an air inlet adapted to receive air from the outside environment of the aircraft and an air outlet adapted to discharge air into the outside environment; and
  a motorized valve having an air loading port directly connected to the air inlet and an air discharge port directly connected to the air outlet, said valve being configured to supply air to the pneumatic ice-breaking device in a pulsating way;
  wherein, when the aircraft is in motion, the kinetic energy of the air at the air inlet and originating from the relative motion between the air and the aircraft is converted into air pressure at the pneumatic ice-breaking device, and wherein the air outlet is positioned so that, when the aircraft is in motion, the air pressure at the air outlet is lower than the outside ambient pressure.

As there are no machines to generate an air flow directly to the valve or for storing pneumatic energy in a reservoir, the "pulsating conversion" of the dynamic pressure of the outside air into static pressure is only possible when the airplane is in motion. By virtue of the motorized valve, the conversion of the dynamic pressure of the outside air into static pressure is cyclic over time and each pressurization cycle is followed by a depressurization cycle; the pressurization cycle of the pneumatic ice-breaking device ("boot") modifies the shape of the latter so as to cause the ice deposited on the outer surface of the same device to break; the depressurization cycle of the "boot" restores the original shape of the latter.

Unlike the known systems described above, the valve is used to gain advantage from the dynamic pressure of the air outside the moving aircraft by avoiding the consumption of pneumatic energy generated or stored inside the same aircraft.

According to a specific embodiment, the valve comprises a stator and a motorized valve member rotatably mounted inside the stator,
  wherein the stator has an air loading port and an air discharge port, as well as a pressurization port and a depressurization port adapted to be fluidically connected to the pneumatic ice-breaking device,
  wherein the valve member has a first and a second passage formed transversely therethrough, whereby in operation the valve member is capable of cyclically rotating between a pressurization position, in which the air loading port is fluidically connected to the pressurization port through the first passage while the depressurization port is disconnected from the air discharge port, and a depressurization position in which the depressurization port is fluidically connected to the air discharge port through the second passage while the air loading port is disconnected from the pressurization port.

BRIEF DESCRIPTION OF THE DRAWINGS

Some preferred but non-limiting embodiments will now be described; making reference to the accompanying drawings, wherein.

DETAILED DESCRIPTION

Figure 1:
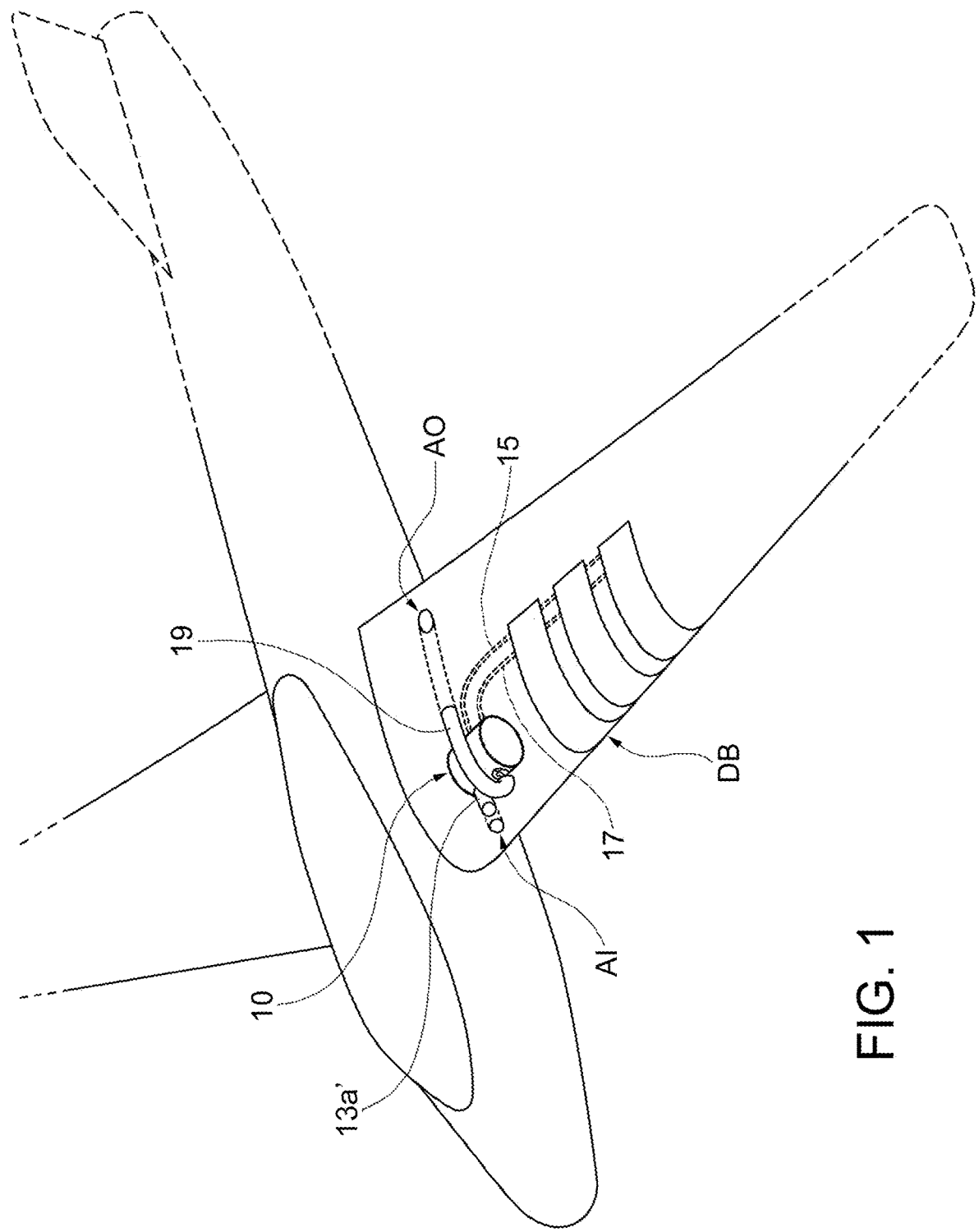
FIG. 1 is a simplified view of a system according to the invention, installed on an aircraft.

With reference to FIG. 1, an ice-breaking device with pulsating membrane DB installed on an aircraft is represented, as well as a corresponding system to supply air to the ice-breaking device.

Such power supply system comprises an air inlet AI, adapted to receive in operation a flow of air from the outside environment, created by the motion of the aircraft in the air.

Figure 2:
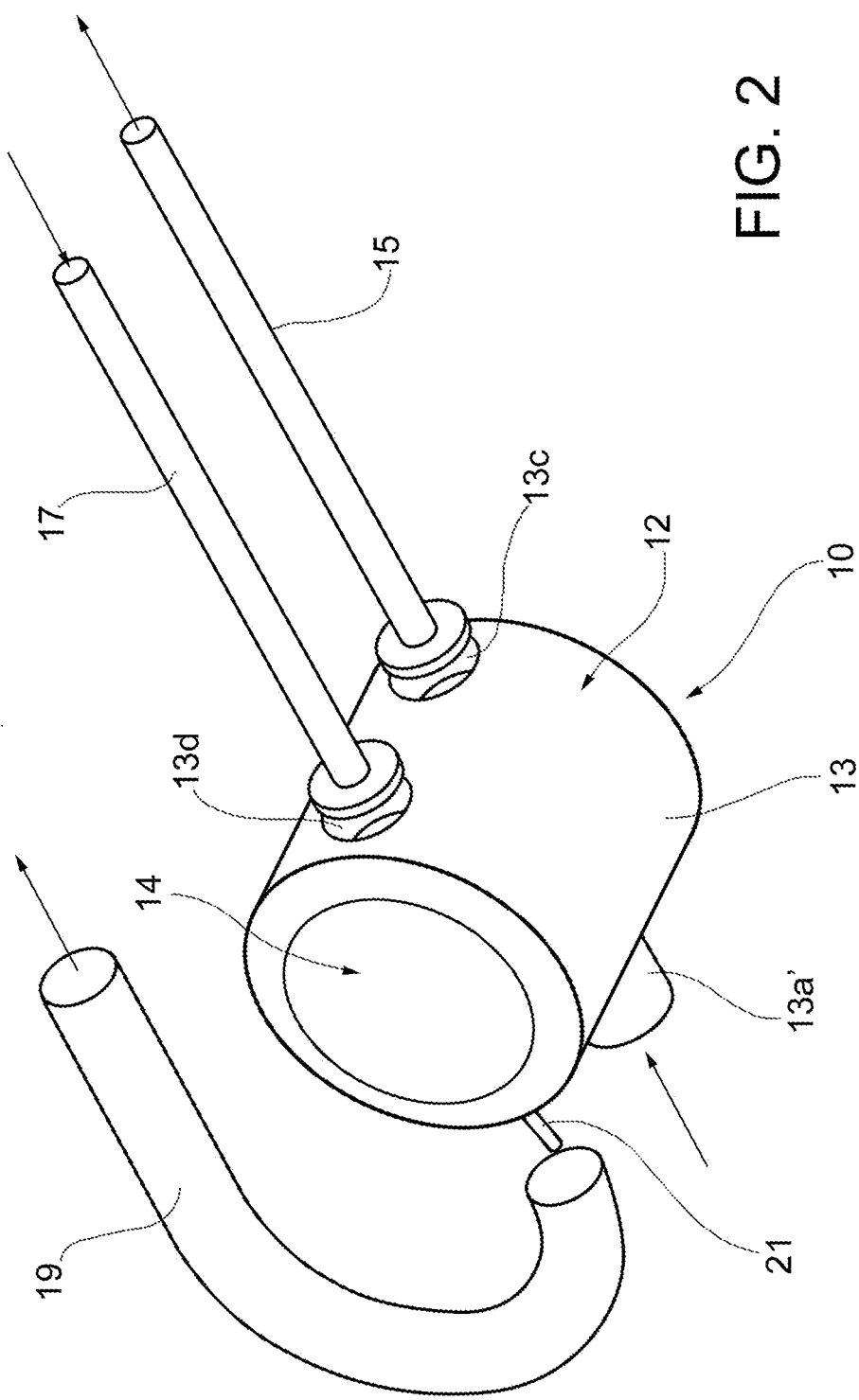
FIGS. 2 and 3 are perspective views showing a valve of the system according to the invention.
Figure 3:
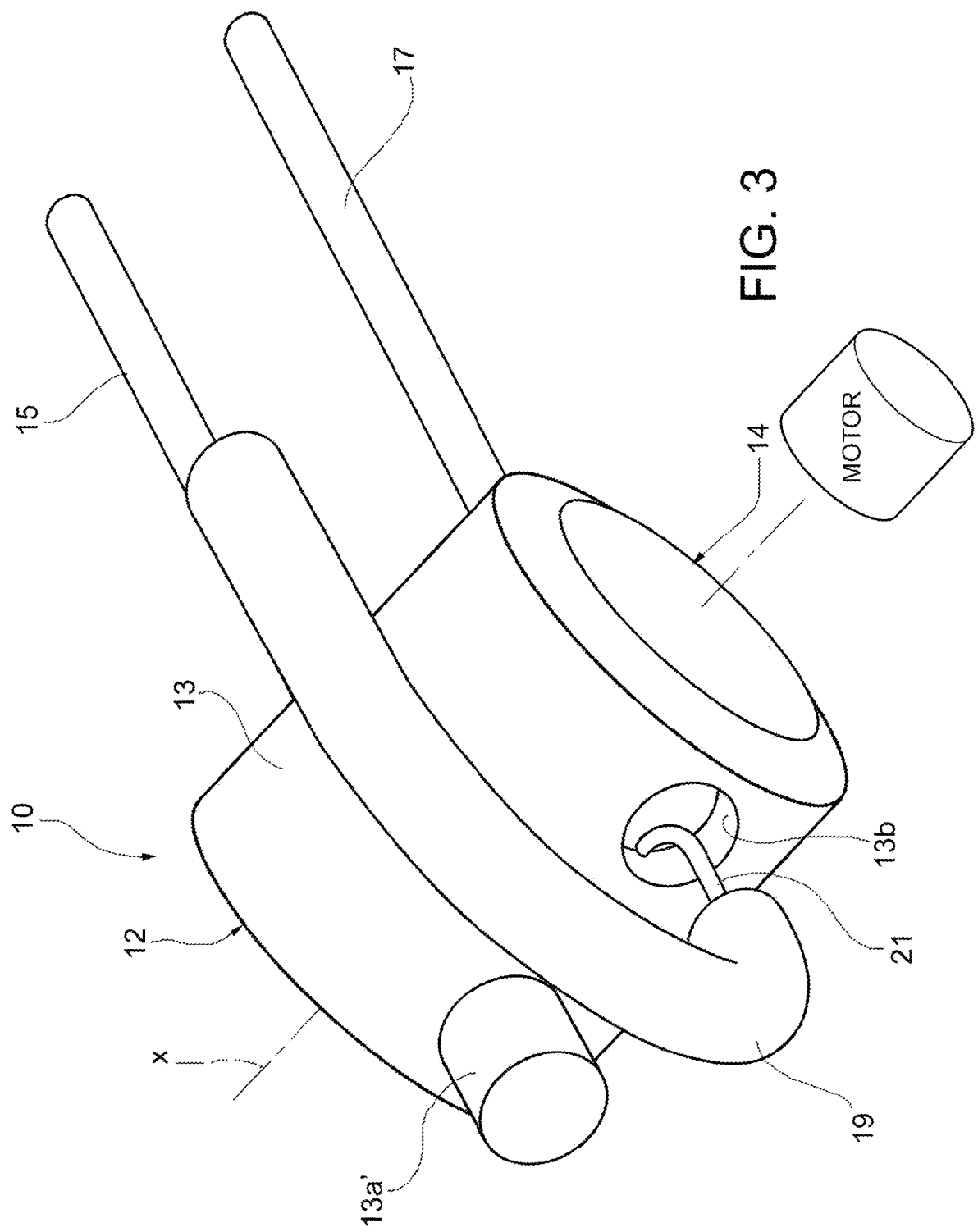
Figure 4:
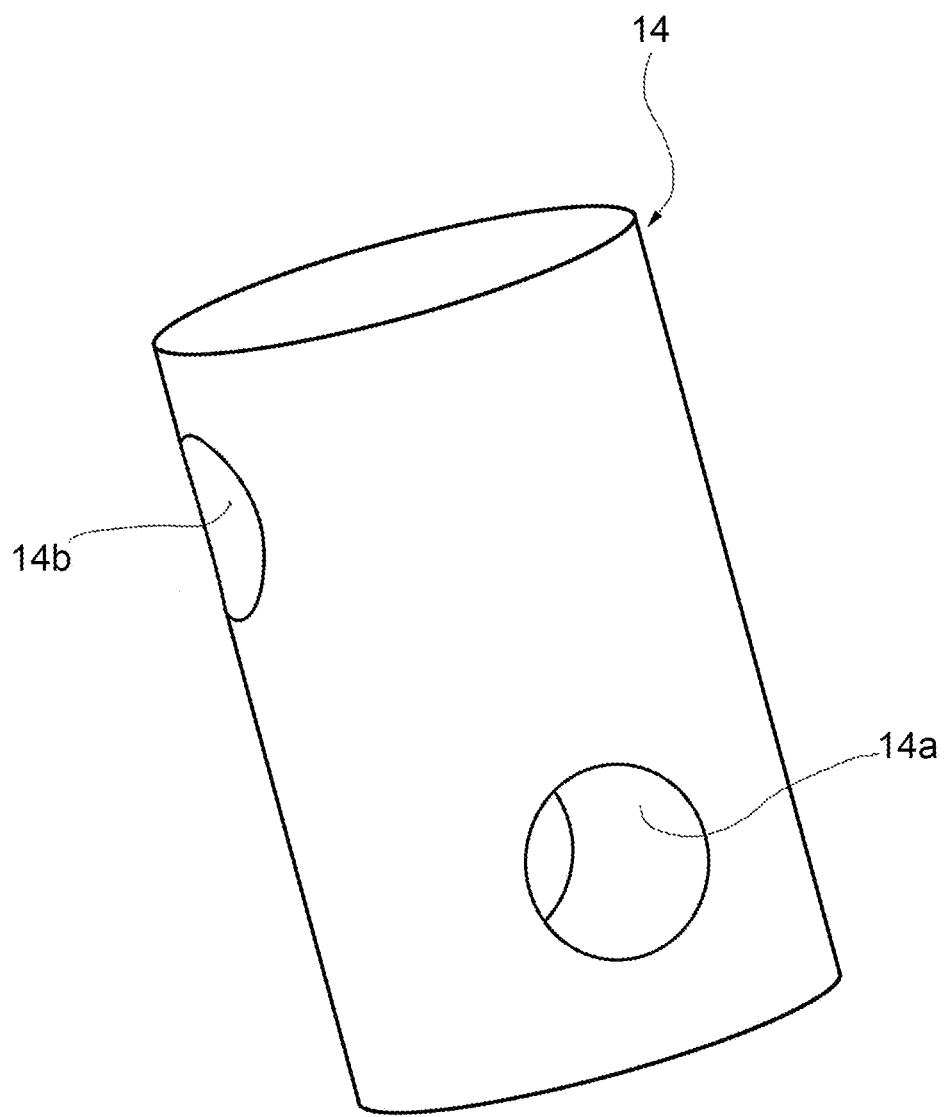
FIG. 4 is a perspective view showing a valve member of the valve of FIGS. 2 and 3.
Figure 5A:
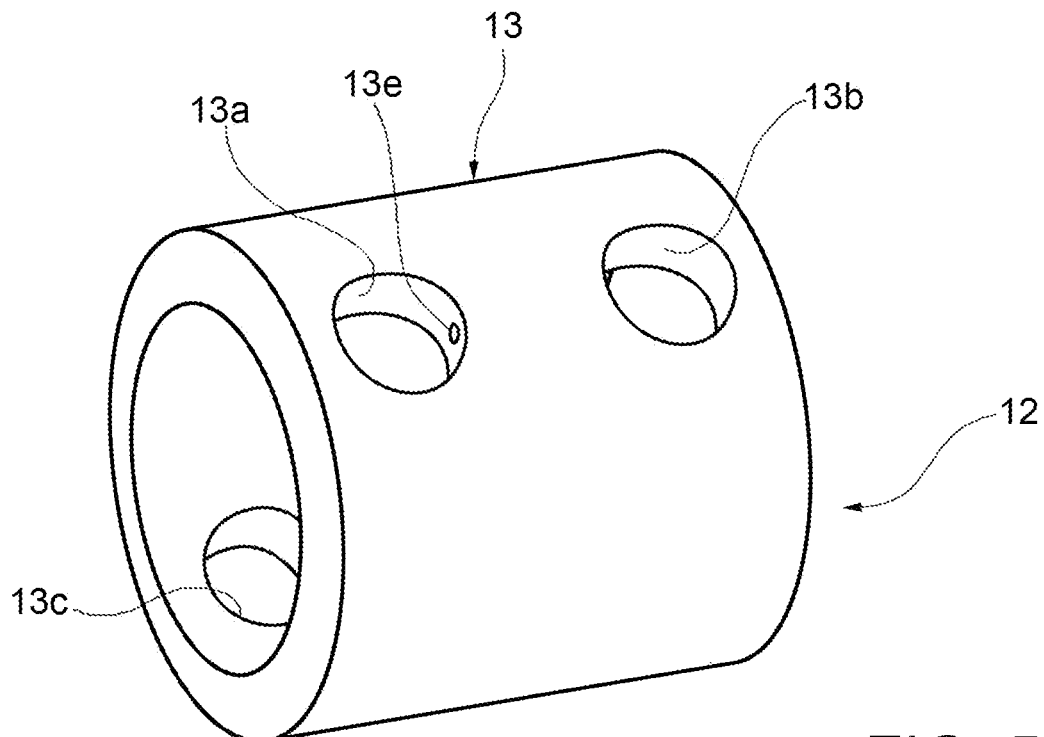
FIGS. 5a and 5b are perspective views showing a stator of the valve of FIGS. 2 and 3.
Figure 5B:
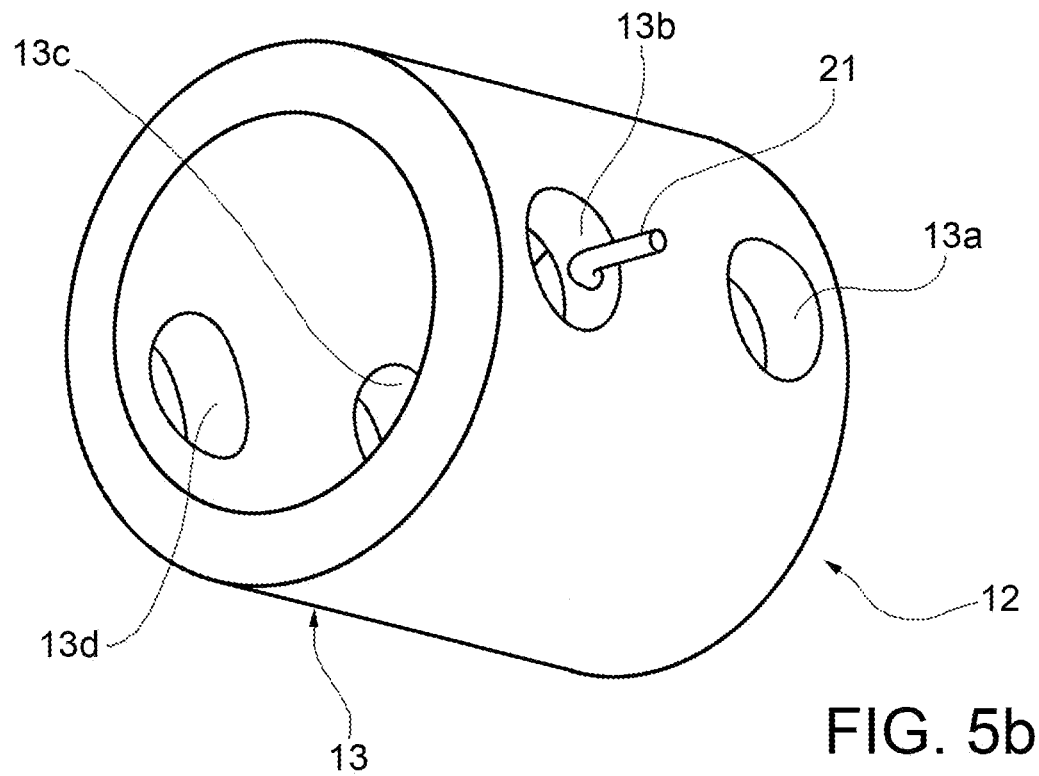

With reference also to FIGS. 2 and 3, the system further includes a valve 10 arranged downstream of the outside air inlet AI, and comprising a stator 12 also shown in FIGS. 5a and 5b, and a rotary valve member 14 also shown in FIG. 4, which is able to rotate around an axis, indicated at x.

The stator or valve body 10 comprises a wall 13 surrounding a cylindrical cavity, wherein the rotor 14 is mounted. On the wall 13, four through-openings are made, indicated at 13a, 13b, 13c and 13d, which in the following will be respectively indicated as air loading port, air discharge port, pressurization port and depressurization port, the function of which will become clear in the following description.

The air loading port 13a is fluidically connected to the air inlet AI through an inlet mouth 13a' (or other type of inlet piping element).

The air loading port 13a and the pressurization port 13c are arranged at a first level with respect to the rotation axis x of the valve member 14, while the air discharge port 13b and the depressurization port 13d are arranged at a second level with respect to the rotation axis x of the valve member 14, different from the first level.

In particular, the air loading port 13a and the pressurization port 13c are aligned with each other according to a first axis orthogonal to the rotation axis x, while the air discharge port 13b and the depressurization port 13d are aligned with each other according to a second axis orthogonal to the rotation axis x, parallel to the first axis.

The valve member or rotor 14 is operationally connected to an actuator or motor, controllable to draw the valve member 14 in rotation with respect to the stator 12.

The valve member 14 has a first and a second passage 14a, 14b, rectilinear and obtained transversely through the body of the valve member. The first passage 14a is arranged at the level of the air loading port 13a and of the pressurization port 13c, arranged at a first level with respect to the rotation axis x of the valve member 14, while the second passage 14b is arranged at the level of the air discharge port 13b and the depressurization port 13d.

The passages 14a and 14b extend orthogonally to the rotation axis x of the valve member 14, angularly staggered from each other, e.g. by an angle of 90°.

Other geometric arrangements of the ports of the stator and the passages of the rotor are possible, although the one described above is preferable for the operation of the system.

The system also comprises a pressurization channel 15, which at one end is fluidically connected to the pressurization port 13c of the valve 10, and at the opposite end is fluidically connected to an inlet of the pneumatic ice-breaking device.

The cross-section of the inner opening of the pressurization channel 15 is smaller than the cross-section of the inlet mouth 13a'. Moreover, the pressurization channel 15 and the inlet mouth 13a' extend along the same geometric axis, coinciding with the geometric axis along which the ports 13a and 13c are aligned. Other geometric arrangements are however possible.

The system also comprises a depressurization channel 17, which at one end is fluidically connected to the depressurization port 13d of the valve 10, and at the opposite end is fluidically connected to an outlet of the pneumatic ice-breaking device.

An air discharge duct 19 is further provided, which at one end is fluidically connected to the air discharge port 13b of the valve 10, and at the opposite end is fluidically connected to an air outlet AO arranged on the aircraft and positioned so that, in operation, the air pressure thereon is lower than the outside ambient pressure.

The cross-section of the inner opening of the depressurization channel 17 is smaller than the cross-section of the air discharge duct 19. Moreover, the depressurization channel 17 and an end part of the air discharge duct 19 extend along a same geometric axis, coinciding with the geometric axis along which the openings 13b and 13d are aligned. Other geometric arrangements are however possible.

The system further comprises a suction pump 21 located at the air discharge port 13b, in particular a Venturi-effect pump, activated by a flow of air coming from the air loading port 13a. For such purpose, in the wall 13 of the stator 12, a duct 13e may be provided between the air loading port 13a and the air discharge port 13b, which is designed to supply air from the air loading port to the pump 21. Alternatively, a duct outside the stator body 12 may be provided.

Figure 6:
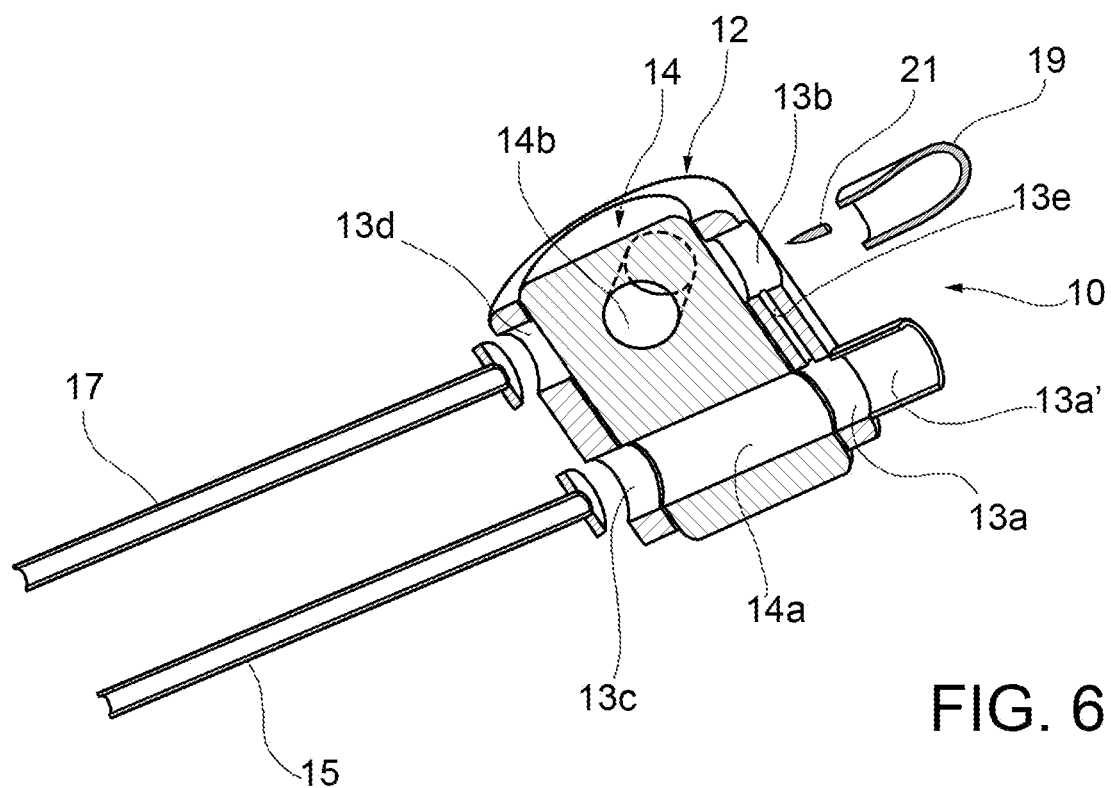
FIGS. 6 and 7 are sectioned perspective views showing the valve, respectively in a pressurization position and a depressurization position.
Figure 7:
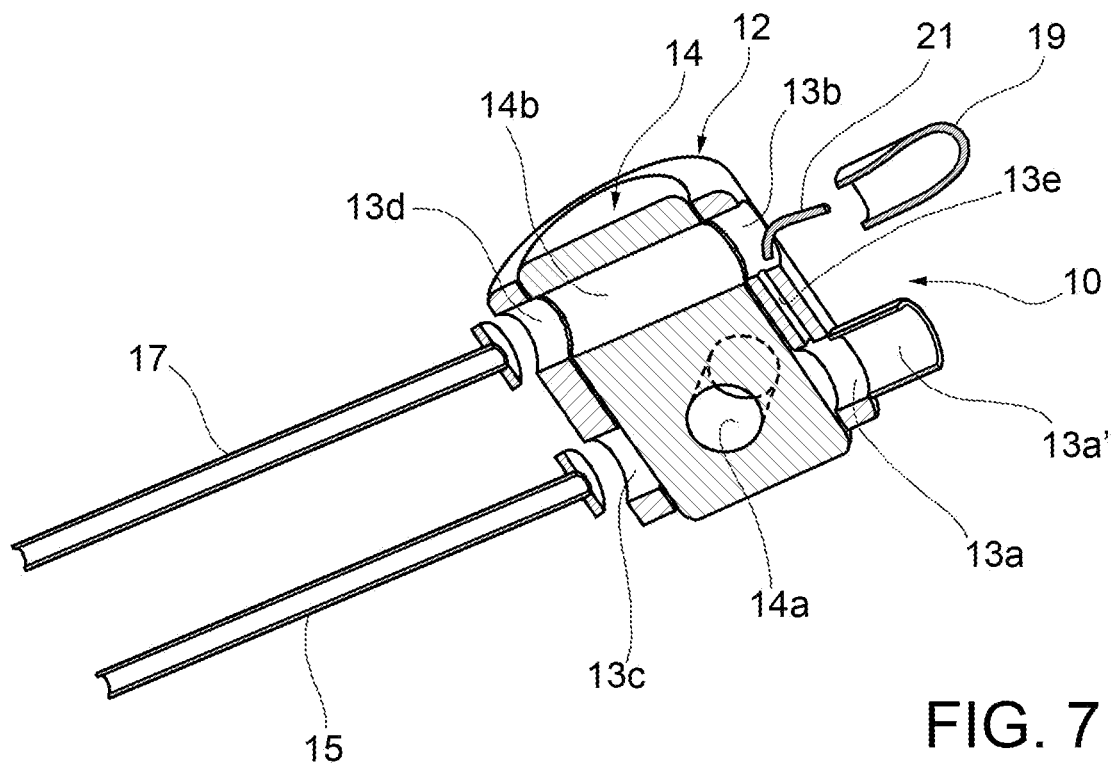

In operation, following a command given to the relevant motor or actuator, the valve member 14 is able to cyclically rotate between a pressurization position (FIG. 6), in which the air loading port 13a is fluidically connected to the pressurization port 13c through the first passage 14a while the depressurization port 13d is disconnected from the air discharge port 13b, and a depressurization position (FIG. 7) in which the depressurization port 13d is fluidically connected to the air discharge port 13b through the second passage 14b while the air loading port 13a is disconnected from the pressurization port 13c.

At each pressurization stage, an air flow therefore enters from the air inlet AI and arrives at the ice-breaking device DB after having passed through the inlet mouth 13a', the air loading port 13a, the first passage 14a, the pressurization port 13c and the pressurization duct 15; the kinetic energy of the air flow at the air inlet AI is then converted into air pressure at the pneumatic ice-breaking device DB, which is then inflated.

At each depressurization stage, the ice-breaking device DB is fluidically connected to the air outlet AO through the depressurization duct 17, the depressurization port 13d, the second passage 14b, the air discharge port 13b and the air discharge duct 19; an air flow therefore escapes from the ice-breaking device (which then deflates) as a result of the pressure difference between the ice-breaking device and the air discharge. Moreover, the discharge flow is accelerated by the suction pump 21, increasing the depressurization of the ice-breaking device.

The rotor feed may be configured to always rotate the valve member in the same direction, or to cyclically reverse the direction of rotation of the valve member. In any case, it is possible to obtain repeated cycles of pressurization and depressurization.

The motor or actuator of the valve member may be configured to allow an adjustment of the rotation speed of the valve member and thus allow an adjustment of the work cycle of the system.

The invention claimed is:

1. A method for operating an ice-breaking system in an aircraft in motion, the ice-breaking system comprising
    a pneumatic ice-breaking device;
    an air inlet and an air outlet; and
    a motorized valve having an air loading port connected to the air inlet and an air discharge port connected to the air outlet, said valve being configured to supply air to the pneumatic ice-breaking device in a pulsating way;
    wherein the method comprises
    receiving air from the environment outside the aircraft, through the air inlet, and
    discharging air into the outside environment, through the air outlet, wherein the method by further comprises
converting the kinetic energy of the air at the air inlet, originating from the relative motion between the air and the aircraft, into air pressure at the pneumatic ice-breaking device, without consuming pneumatic energy generated or stored inside the aircraft,
wherein the air outlet is positioned so that the air pressure at the air outlet is lower than an outside ambient pressure.

2. The method according to claim 1, wherein the valve comprises a stator and a motorized valve member rotatably mounted inside the stator,
wherein the stator has an air loading port and an air discharge port, as well as a pressurization port and a depressurization port, fluidically connected to the pneumatic ice-breaking device,
wherein the valve member has a first and a second passage formed transversely therethrough, whereby in operation the valve member is able to cyclically rotate between a pressurization position, in which the air loading port is fluidically connected to the pressurization port through the first passage while the depressurization port is disconnected from the air discharge port, and a depressurization position in which the depressurization port is fluidically connected to the air discharge port through the second passage while the air loading port is disconnected from the pressurization port.

3. The method according to claim 2, wherein the air loading port, the pressurization port and the first passage are arranged at a first level with respect to a rotation axis of the valve member, and the air discharge port, the depressurization port and the second passage are arranged at a second level with respect to the rotation axis of the valve member, different from the first level.

4. The method according to claim 3, wherein the first passage and the second passage are rectilinear and extend orthogonally to the rotation axis of the valve member, angularly staggered with each other.

5. The method according to claim 2, further comprising a suction pump arranged at the air discharge port.

6. The method according to claim 5, wherein the suction pump is a Venturi-effect pump, said pump being driven with air from the air loading port.

7. The method according to claim 6, wherein in the stator a duct is provided, formed between the air loading port and the air discharge port, said duct being provided for feeding air from the air loading port to the Venturi-effect pump.

8. The method according to claim 1, wherein the pneumatic ice-breaking device is an ice-breaking device with pulsating membrane.

* * * * *